US011372880B2

(12) United States Patent
Nothnagel (10) Patent No.: US 11,372,880 B2
(45) Date of Patent: Jun. 28, 2022

(54) DATA SOURCE SYSTEM AGNOSTIC FACT CATEGORY PARTITIONED INFORMATION REPOSITORY AND METHODS FOR THE INSERTION AND RETRIEVAL OF DATA USING THE INFORMATION REPOSITORY

(71) Applicant: CRYSP INTELLIGENCE PTY LTD, Belmont (AU)

(72) Inventor: Vaughan Nothnagel, Secret Harbour (AU)

(73) Assignee: CRYSP INTELLIGENCE PTY LTD, Belmont (AU)

(*) Notice: Subject to any disclaimer, the term of this patent is extended or adjusted under 35 U.S.C. 154(b) by 225 days.

(21) Appl. No.: 16/078,603

(22) PCT Filed: Feb. 24, 2017

(86) PCT No.: PCT/AU2017/050166
§ 371 (c)(1),
(2) Date: Aug. 21, 2018

(87) PCT Pub. No.: WO2017/143405
PCT Pub. Date: Aug. 31, 2017

(65) Prior Publication Data
US 2019/0050464 A1    Feb. 14, 2019

(30) Foreign Application Priority Data
Feb. 26, 2016    (AU) .................. 2016900704

(51) Int. Cl.
*G06F 16/25* (2019.01)
*G06Q 30/02* (2012.01)
(Continued)

(52) U.S. Cl.
CPC ...... *G06F 16/254* (2019.01); *G06F 16/24554* (2019.01); *G06F 16/25* (2019.01);
(Continued)

(58) Field of Classification Search
CPC .... G06F 16/25; G06F 16/28; G06F 16/24554; G06Q 10/10; G06Q 30/02; G06Q 10/087
(Continued)

(56) References Cited

U.S. PATENT DOCUMENTS

2003/0233297 A1    12/2003    Campbell
2005/0033726 A1    2/2005    Wu et al.
(Continued)

FOREIGN PATENT DOCUMENTS

EP    1870824 A2    12/2007

OTHER PUBLICATIONS

Supplementary European Search Report dated Nov. 20, 2019 from European Application No. 17755658, 2 pages.
(Continued)

*Primary Examiner* — Hosain T Alam
*Assistant Examiner* — Nicholas E Allen
(74) *Attorney, Agent, or Firm* — Innovation Capital Law Group, LLP; Vic Lin (57) ABSTRACT

There is provided data source system agnostic fact partitioned data information repository system comprising: a data repository comprising: a plurality of fact partitions; a plurality of dimensions stored in relation to the fact partitions, the plurality of dimensions shared by each of the fact partitions; and a plurality of data source system specific data mappings; a data receiver for receiving data from the plurality of data source systems; and a data mapper for partitioning the data into the plurality of fact partitions using the plurality of data source system specific data mappings.

19 Claims, 6 Drawing Sheets

(51) Int. Cl.
*G06Q 10/10* (2012.01)
*G06F 16/28* (2019.01)
*G06F 16/2455* (2019.01)
*G06Q 10/08* (2012.01)

(52) U.S. Cl.
CPC ............. *G06F 16/28* (2019.01); *G06Q 10/10* (2013.01); *G06Q 30/02* (2013.01); *G06Q 10/087* (2013.01)

(58) Field of Classification Search
USPC ........................................................ 707/602
See application file for complete search history.

(56) References Cited

U.S. PATENT DOCUMENTS

| | | | |
|---|---|---|---|
| 2006/0010113 A1* | 1/2006 | Berger | G06F 16/283 |
| 2007/0239711 A1 | 10/2007 | Unnebrink et al. | |
| 2008/0120129 A1 | 5/2008 | Seubert et al. | |
| 2009/0271345 A1 | 10/2009 | Rich et al. | |
| 2009/0276603 A1* | 11/2009 | Menon | G06F 16/24556 711/173 |
| 2010/0070421 A1 | 3/2010 | Fazal et al. | |
| 2010/0106747 A1 | 4/2010 | Honzal et al. | |
| 2010/0192148 A1* | 7/2010 | Chen | G06F 16/278 718/1 |
| 2011/0295795 A1* | 12/2011 | Venkatasubramanian | G06F 16/254 707/602 |
| 2013/0151491 A1* | 6/2013 | Gislason | G06F 16/2282 707/696 |
| 2013/0173657 A1* | 7/2013 | James | G16H 10/60 707/769 |
| 2014/0101206 A1* | 4/2014 | Rawal | G06F 16/256 707/803 |
| 2014/0279834 A1* | 9/2014 | Tsirogiannis | G06F 16/211 707/602 |
| 2014/0310231 A1* | 10/2014 | Sampathkumaran | G06F 16/254 707/602 |
| 2014/0344210 A1* | 11/2014 | Leigh | G06F 16/25 707/602 |
| 2015/0363464 A1* | 12/2015 | Alves | G06F 16/24568 707/765 |
| 2016/0048572 A1* | 2/2016 | Khandelwal | G06F 16/283 707/604 |
| 2016/0179922 A1* | 6/2016 | Crupi | G06F 16/243 707/737 |
| 2017/0011104 A1* | 1/2017 | Hyde | G06F 16/211 |
| 2017/0017683 A1* | 1/2017 | Fourny | G06F 16/2272 |
| 2018/0039695 A1* | 2/2018 | Chalabi | G06N 5/022 |

OTHER PUBLICATIONS

Australian Search Report dated Sep. 16, 2016 from corresponding Australian Application No. 2016900704.
International Search Report & Written Opinion dated May 17, 2017 from corresponding PCT Application No. PCT/AU2017/050166.

* cited by examiner

DATA SOURCE SYSTEM AGNOSTIC FACT CATEGORY PARTITIONED INFORMATION REPOSITORY AND METHODS FOR THE INSERTION AND RETRIEVAL OF DATA USING THE INFORMATION REPOSITORY

FIELD OF THE INVENTION

The present invention relates generally to data warehousing and in particular to a data source system agnostic fact category partitioned information repository and associated methods for the insertion and retrieval of data using the information repository.

BACKGROUND AND SUMMARY OF THE INVENTION

Problems exist with conventional data warehousing techniques in that data is source system specific and data warehouses store the data in a like structural context.

For example, the main approaches to data warehousing comprise the dimensional approach and the normalized approach.

In a dimensional approach (proposed by Ralph Kimball), data is partitioned into "facts", which are normally organised by subject area, and "dimensions", which are the reference information that gives context to the facts.

Figure 1:
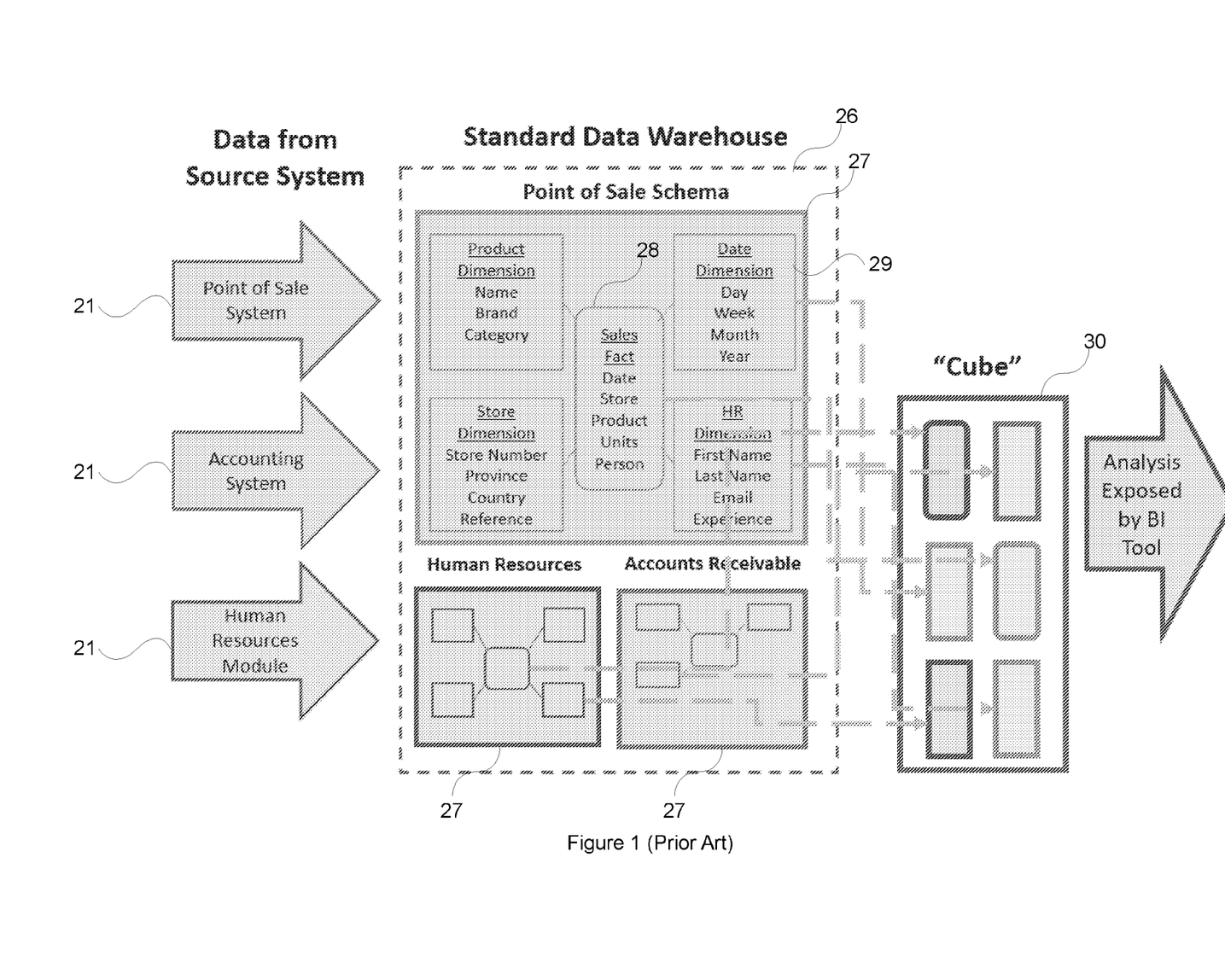
FIG. 1 shows a prior art dimensional approach data warehouse.

Such prior art data warehouse utilising the dimensional approach is shown in FIG. 1.

As can be seen, for each source system 21, the prior art data dimensional data warehouse 26 comprises an associated subject area 27.

For example, for the point of sale system 21 subject area 27 a sales transaction can be broken up into facts 28 such as the number of products ordered and the price paid for the products, and into dimensions 29 such as order date, customer name, product number, order ship-to and bill-to locations, and salesperson responsible for receiving the order.

A key advantage of a dimensional approach is that the data warehouse is easier for the user to understand and to use. Also, the retrieval of data from the data warehouse tends to operate very quickly. Dimensional structures are easy to understand for business users, because the structure is divided into measurements/facts and context/dimensions. Facts are related to the organisation's business processes and operational system whereas the dimensions surrounding them provide context. Another advantage offered by the dimensional model is that it does not always require relational database queries. Thus, this type of modelling technique is very useful for end-user queries.

However, a disadvantage of the dimensional approach is that, in order to maintain the integrity of facts and dimensions, loading the data warehouse with data from different operational systems is complicated. In most if not all instances, the facts constructed and stored in the data warehouse are operational transaction or process specific, called "Subject Area" facts. These facts are tightly constrained to their subject area, and therefore do not lend themselves to relational analytics without extensive deconstruction. Similarly, the time context across defined subject areas is often disparate implying that time, as a dimension, has to be range bound and may not easily represent an instant in time across all facts.

Furthermore, using the dimensional approach it is difficult to modify the data warehouse structure if the organisation adopting the dimensional approach changes business process since the "subject area" changes to align to the new business and the old data becomes obsolete. Additionally, the number of dimensions required to describe the multiple subject areas of an organisation within the data warehouse leads to a rapidly expanding and complex schema or design, with many, often duplicated, dimensions.

Furthermore, extraction of the data from the various disparate subject areas 27 of the prior art dimensional data warehouse 26 requires the generation of data "cubes" 30 which selectively select and relate various data for various purposes, such as for example, analysing sales staff performance. Not only is the setting up and utilisation of cubes, cumbersome, it can also result in undesirous data duplication.

In the normalized approach (proposed by Bill Inmon), the data in the data warehouse is stored following, to a degree, database normalization rules. Tables are grouped together by subject areas that reflect general data categories (e.g., data on customers, products, finance, etc.). The normalized structure divides data into entities, which creates several tables in a relational database.

When applied in large enterprises, the normalized approach results in many tables that are linked together by a web of joins. Furthermore, each of the created entities is converted into separate physical tables when the database is implemented.

The main advantage of the normalized approach is that it is straightforward to add information into the database. A disadvantage of this approach is that, because of the number of tables involved, it can be difficult for users to join data from different sources into meaningful information and to access the information without a precise understanding of the sources of data and of the data structure of the data warehouse.

The present invention seeks to provide a static and configurable data warehouse structure, which will overcome or substantially ameliorate at least some, if not all, of the deficiencies of the prior art, or to at least provide a sustainable alternative.

As such, the present invention relates to a data repository that is both transactional data and data source system agnostic.

Figure 2:
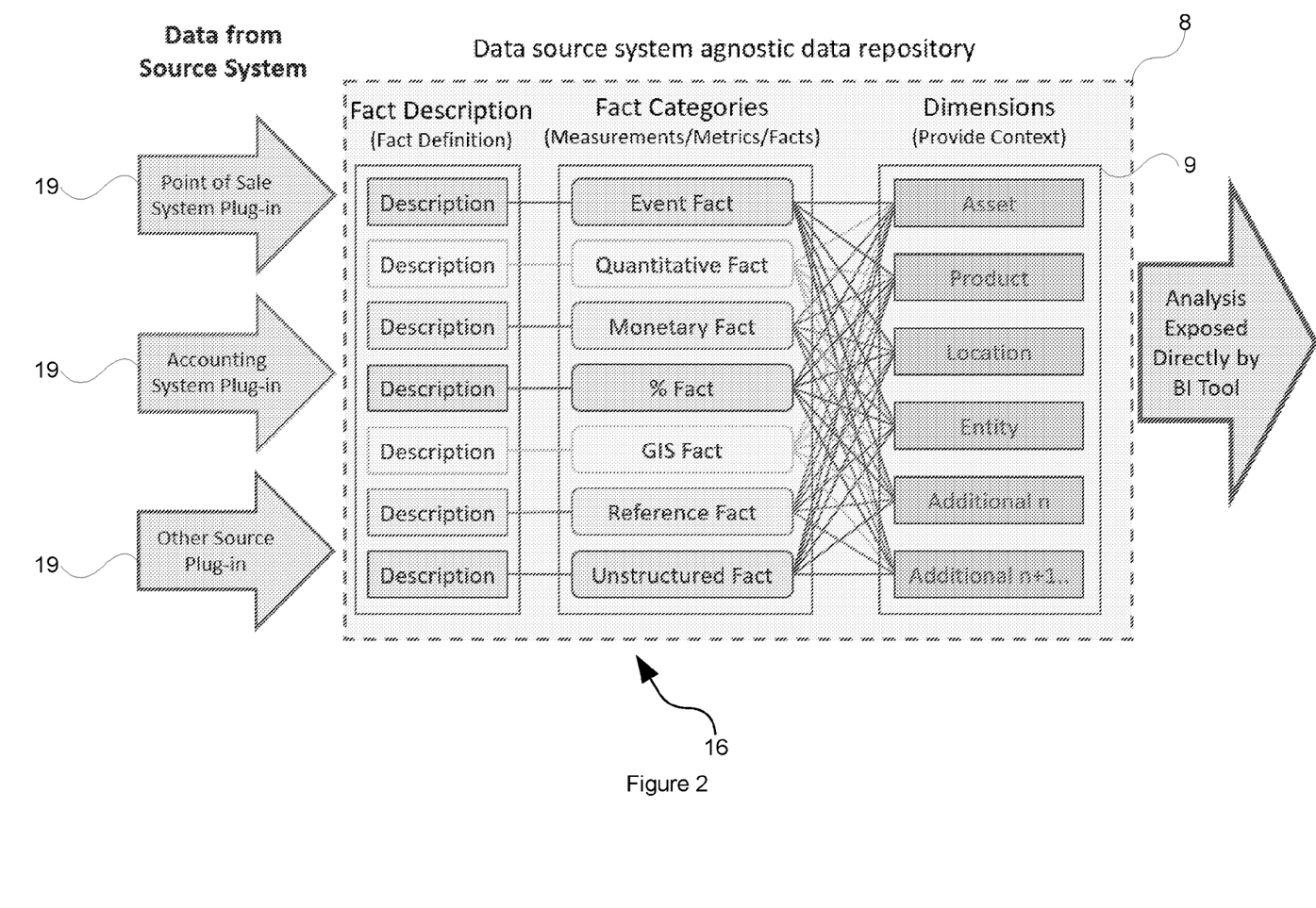
FIG. 2 shows a data source system agnostic repository in accordance with an embodiment.

Specifically, as is shown in FIG. 2, the present data repository 8 is divided into particular fact partitions 16 (categorised by the type or category of data, rather than subject area) and particular customisable dimensions stored in relation to the fact partitions 16.

Furthermore, data source specific mappings/plugins 19 are utilised to map/translate data received from different data source systems into an appropriate format for storage within the particular fact partitions and associated dimensions.

In this way, the present data repository can be used for receiving and sharing data from differing operational and other source systems, without modification to the underlying fact partitions, existing reporting, analytical processes and dimensions.

Additionally, should business specific customisation be required, additional contextual information may be stored within the present data repository by adding columns to the relevant shared dimensions database table or tables.

Using the above defined repository, data may be received from a plurality of data source systems (such as human resources, payroll, e-commerce, retail, production warehousing, inventory control and other types of operational systems) without necessitating the inclusion of additional fact tables. Then source system specific mappings may be used to map/decompose/partition the data received from each different operational system into the common repository format for the underlying fact partitions and dimensions.

Similarly, for retrieval, the data may be used as is within the repository, or alternatively "reverse-mapped" or "reconstructed" using relevant source system specific mappings to map the data stored within the underlying fact partitions and dimensions into data appropriate for each operational system.

As such, present embodiments may use a publish/push instead of pull method to allow execution of data transfer at the time of the business transaction.

Furthermore, the present fact partitioned repository 8 may accept all new data streams with no schema redesign.

Furthermore, the present fact partitioned repository 8 negates the need for addition of new fact types when new business constructs are added.

Furthermore, present methodologies allow for standardised load processes facilitating rapid acceptance of new data streams Furthermore, the present fact partitioned repository structure allows for a static load processes, which means that only the data extraction from the repository may need configuring thereby avoiding staging during data input wherein records are cleansed at source.

Furthermore, the present fact partitioned repository provides granular, deconstructed and reliable (direct from source) data thereby eliminating the need for data marts/cubes. As the data is deconstructed during the PTL process into the relevant fact partitions and associated dimensions directly from its "source of truth", there is no requirement for a data mart or cube between the repository and the analytics tools in that the present repository itself becomes that data mart or cube. The granularity of the data also facilitates an "apples to apples" comparison, and delivers consistency and reliability.

Furthermore, the present methodologies allow for the rejection of dirty records at source prior to entry into the repository thereby removing integrity issues.

In comparison to the prior art, US 2010/0070421 A1 (FAZAL et al.) (hereafter "D1") discloses a data warehouse system for managing performance of organisations. The data warehouse system of D1 comprises a data model for storing data representing dimensions and measures applicable for multiple organisations, and a configuration unit for setting the placeholders such that the data model represents the particular organisation. This constitutes a single fact definition used in the same context across many organisations and not a multi-category collection of fact structures.

However, D1 is directed to providing a particular database structure for recording operational performance and is therefore not directed to the problem of providing operational system agnostic storage of data for reporting or analytical purpose. The data warehouse record is clearly organised by the underlying business function, or "subject area" (e.g. "sales analysis") rather than the data type, or category.

US 2009/0271345 A1 (RICH et al.) (hereafter "D2") discloses a data warehouse that is constructed using the relational mapping of a transactional database without reconstructing the data relationships of the transactional database. First, an application programmer analyses an object model in order to describe facts and dimensions using the objects, attributes, and paths of the object model. Each of the dimensions has an identifier that correlates an item in the transactional database to a dimension record in the data warehouse. The fact and dimension descriptions are saved to a description file. Second, a Data Warehouse Engine (DWE) then access the description file and uses the object model, fact and dimension descriptions, and object-relational mapping to map transactional data to the data warehouse. This constitutes a single fact category definition for singular data warehousing retention and analysis.

However, D2 cites singular mapping of the source transaction by object definition, effectively a singular "subject area" associated to a single transaction type that has no scope beyond the current object type nor is there any ability to deliver flexibility of transactional data context since the object definition is static.

US 2010/0106747 A1 (HONZAL et al.) (hereafter "D3") discloses populating data marts with dimensional data models from a set of data repositories that contain factual and association information about a set of related assets are disclosed. An intermediate data warehouse is generated to process the facts and associations for each asset. Using the intermediate warehouse, one or more data marts are generated with fact tables, dimensions, and hierarchies to fully model the information available for each asset.

However, D3 indicates a 'staging' relational database applicable to data that is already in a data warehouse repository or similar (specifically referred to in D3 as an "intermediate data warehouse"). Such staging occurs prior to entering the cubed form and serves to clearly articulate the current data warehouse static dimensions related to one information type only.

US 2003/0233297 A1 (CAMPBELL) (hereafter "D4") discloses a transaction-related dimension of tax-related data for generating fact details to facilitate payment of taxes. First, a transaction-related dimension of tax-related data is provided along with a plurality of attributes for the transaction-related dimension. Such attributes include a transaction line item determined based on a transaction identifier, a transaction type, a tax type, a customer account identifier, a sold to location geographic code, a ship to location geographic code, a contract number, a purchase order number, a vendor account identifier, and a vendor zip code. Next, a plurality of entries are received which are associated with the attributes of the transaction-related dimension. A plurality of fact details are then generated using the entries of a predetermined set of the attributes of the transaction-related dimension. Thereafter, the fact details are outputted.

However, D4 represents a single business type, or subject area (Taxation) and has no associated capability to store transactions from other business types (e.g. Mining and Manufacturing), also, there is no context capability beyond the single taxation model in the financial services so such items as a mortgage or credit agreement has no place in this model.

US 2008/0120129 A1 (SEUBERT et al.) (hereafter "D5") discloses a business object model, which reflects data that is used during a given business transaction, utilised to generate interfaces. This business object model facilitates commercial transactions by providing consistent interfaces that are suitable for use across industries, across businesses, and across different departments within a business during a business transaction.

However, D5 transactions are subject area specific and hold no association to one another therefore provide no internal ability for analytics without specific deconstruction.

US 2007/0239711 A1 (UNNEBRINK et al.) (hereafter "D6") discloses mapping of a transactional data model to a reporting data model are described which include receiving a transactional data model and a view that includes a collection of view fields, each view field referencing an object in the transactional data model, mapping one or more of a plurality of view fields in the collection to one or more of a plurality of data warehouse objects, and grouping the mapped data warehouse objects into a reporting data model.

However, D6 distinctly describes a normal data warehouse whose user perspective of the subject area specific data (rather than the categorisation of the data) are made more usable by redefinition in a view, as opposed to any transactional decomposition.

As can be appreciated from the foregoing, none of the cited references are directed to the problem of providing an information repository that is data source system agnostic.

Furthermore, none of the cited references teach or suggest the features of present embodiments including a repository structure comprising fact partitions which are partitioned in accordance with particular fact partition types (being the categories of data rather than the generative subject area) and stored in relation to various shared dimensions.

Furthermore, none of the cited references teach or disclose the utilisation of a data mapper for translating/mapping/partitioning received data in accordance with data source system specific data mappings so as to be able to translate data from a plurality of data source systems into a common format applicable for the particular fact partition and associated shared dimensions data structure.

As will become apparent from the ensuing description, the data source system agnostic information repository of the present embodiments differs from the dimensional approach and the normalised approach of the prior art describe above.

Specifically, whereas the data source system agnostic information repository of present embodiments may be thought of as being more related to the prior art dimensional approach than the normalised approach, the data source system agnostic information repository of present embodiments differs primarily from the prior art dimensional approach in that facts, in accordance with present embodiments, are partitioned in accordance with data category or type, rather than subject area. As alluded to above in the background section, prior art dimensional facts are normally organised by subject area, rather than data type or category.

The specific data categories disclosed herein allow for a "universally descriptive" data source system agnostic information repository being able to store transactional, and other data relating to most, if not all, possible scenarios of the physical or logical world thereby overcoming problem of the conventional dimensional approach arrangements where it is difficult to modify the data source system agnostic information repository if the organisation adopting the dimensional approach changes business process, or wishes to introduce data from additional data source systems.

The data source system agnostic information repository further confers further technical advantages in the simplified and efficient retrieval of data stored within the data source system agnostic information repository.

Furthermore, the data structure commonality across operating system allows for cross operational system data ubiquity thereby overcoming problems of the normalised approach wherein it can be difficult for users to join data from different sources and subject areas into meaningful information and to access the information without a precise understanding of the sources of data and of the data structure of the data source system agnostic information repository.

Furthermore, and as will be described below, the data source system agnostic information repository comprises dimensional commonality between the partitioned data categories by utilising specific dimension types, simplifying the data source system agnostic information repository resulting in simplified and efficient insertion and select queries and the like.

As such, with the foregoing in mind, in accordance with one aspect, there is provided a data source system agnostic fact partitioned data information repository system comprising: a data repository comprising: a plurality of fact partitions; a plurality of dimensions stored in relation to the fact partitions, the plurality of dimensions shared by each of the fact partitions; and a plurality of data source system specific data mappings; a data receiver for receiving data from the plurality of data source systems; and a data mapper for partitioning the data into the plurality of fact partitions using the plurality of data source system specific data mappings.

The plurality of fact partitions may comprise an event fact partition for storing an event occurrence.

The plurality of fact partitions may comprise a quantity fact partition for storing a quantity.

The plurality of fact partitions may comprise a monetary fact partition for storing a monetary amount.

The plurality of fact partitions may comprise a GIS fact partition for storing a GIS location.

The plurality of fact partitions may comprise a percentile fact partition for storing a percentile value.

The plurality of fact partitions may comprise a reference fact partition for storing a reference value.

The plurality of fact partitions may comprise an unstructured fact partition for storing a link to unstructured data stored either within the data warehouse or in a different location.

A least one fact partition data types may be at least two fact partition data categories and wherein storing the at least two fact partition data types may comprise storing the at least two fact partition data types in at least two of the fact partitions with each comprising a timestamp value; and wherein retrieving data from the repository may comprise joining the at least two fact partition data types using by timestamp value in order to re-construct a source transaction.

The plurality of dimensions may comprise a product dimension capable of storing product-related data.

The plurality of dimensions may comprise an asset dimension capable of storing asset-related data.

The plurality of dimensions may comprise a location dimension capable of storing location-related data.

The plurality of dimensions may comprise at least one of either physical or logical location-related data.

The plurality of dimensions may comprise an entity dimension capable of storing entity-related data.

According to another aspect, there is provided a data source system agnostic fact category partitioned data information repository system comprising: a data repository comprising: a plurality of fact partitions comprising: an event fact partition for storing an event; a quantity fact partition for storing a quantity; a monetary fact partition for storing a monetary amount; a GIS fact partition for storing a GIS location; a percentile fact partition for storing a percentile value; and a reference fact partition for storing a reference value; a plurality of dimensions stored in relation to the fact partitions, the plurality of dimensions shared by each of the fact partitions, the plurality of dimensions comprising: a product dimension capable of storing product-related data; an asset dimension capable of storing asset-related data; a location dimension capable of storing location-related data; and an entity dimension capable of storing entity-related data; and a plurality of data source system specific data mappings; a data receiver for receiving data from the plurality of data source systems; and a data mapper for partitioning the data into the plurality of fact partitions using the plurality of data source system specific data mappings.

According to another aspect, there is provided a method for storing data within a data source system agnostic information repository system, the system comprising an data repository comprising: a plurality of fact partitions, partitioned by fact partition data types; a plurality of dimensions stored in relation to the fact partitions, the plurality of dimensions shared by each of the fact partitions, the method comprising: receiving data; partitioning the data into at least one fact partition data type; storing the at least one fact partition data type in at least one of the plurality of fact partitions; generating dimensional data; and storing the dimensional data in at least one of the plurality of dimensions in relation to the at least one of the plurality of fact partitions.

The data may be received from at least two data sources and wherein the partitioning may comprise partitioning the data by data source.

Other aspects of the invention are also disclosed.

It is to be understood that, if any prior art information is referred to herein, such reference does not constitute an admission that the information forms part of the common general knowledge in the art, in country.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the data source system agnostic, fact type or category partitioned repository are disclosed and described, it is to be understood that this disclosure is not limited to the particular dimension configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Figure 3:
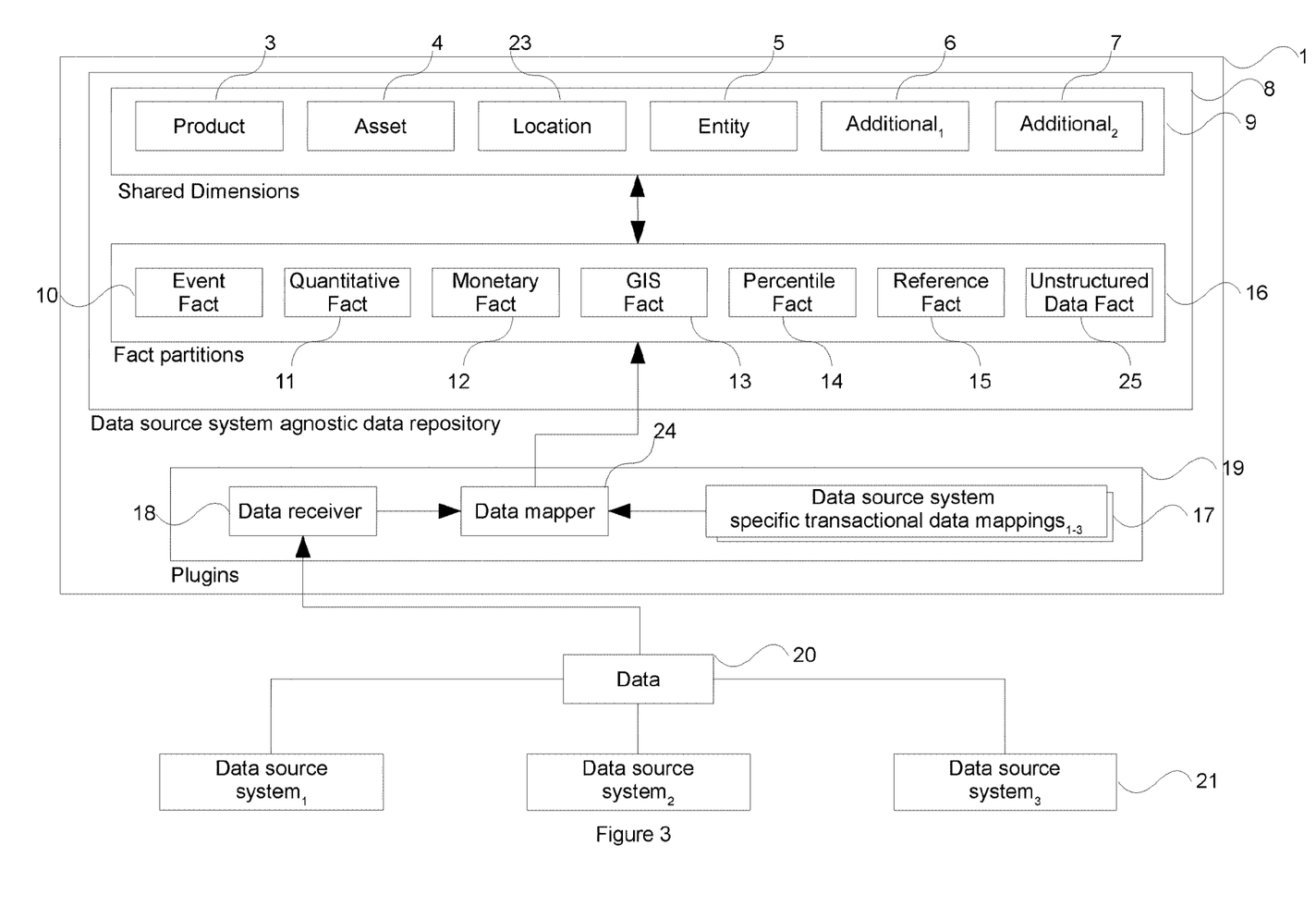
FIG. 3 further shows the data source system agnostic information repository in accordance with an embodiment.

Turning now to FIG. 3, there is shown a system 1 comprising a data source system agnostic information repository 8.

The repository 8 comprises a plurality of particular fact-category partitions 16. The fact partitions 16 are partitioned by partition data types (such as event, quantitative, monetary, percentile, location, reference and unstructured data link datatypes) as will be described in further detail below.

As is better illustrated in FIG. 2, each fact partition comprises a fact category and an associated fact definition/description.

Furthermore, the repository 8 comprises a plurality of shared dimensions 9 stored in relation to the fact partitions 16.

Each partition 16 may have dimensional commonality. In other words, each of the shared dimensions 9 is generally uniformly shared by each of the partitioned data types.

As alluded to above, dimensional commonality simplifies the structure of the repository 8 in that the repository 8 may be implemented by a finite number of tables, thereby simplifying insert and select queries. Furthermore, if business process customisation is required, additional columns may be utilised within the dimensional tables as in lieu of requiring new tables as is the case for the normalised approach.

The plurality of particular fact partitions (partitioned by the various fact partition data categories) stored in relation to the plurality of shared dimensions allows the system 1 to essentially be source system agnostic.

Now, storing data within the repository 8 comprises the system 1 receiving data 20 from source systems 21.

For example, the source systems 21 may be Enterprise Resource Planning (ERP) Point of Sale (PoS), Inventory Management, Logistics or Customer Relationship (CRM) type systems belonging to differing operational systems such as HR, operations, accounting and the like.

For the purposes of retrieving and storing data within the repository 8, the system 1 may be configured with various plug-ins 19 (Such as, for example, FTP Files, Integration Middleware Transactions or Data files) for retrieving and processing the data.

Data Receiver Module 18

The plug-ins 19 may comprise a data receiver module 18 configured to fetch data from various source data systems 21. For example, a plug-in 19 may be a plug-in to the SAP Plant Maintenance (SAP PM) source ERP module.

The data receiver module 18 may be an Enterprise Service Bus (ESB) receiver listening for transactional events in substantial real-time. In alternative embodiments, the data receiver module 18 may fetch or receive data at periodic intervals.

Data Mapping Module 24 and Data Source System Specific Data Mappings 17

The plug-ins 19 may further comprise a data mapping module 24 configured to map the received data into the various fact partitions 16 (and, in embodiments, the shared dimensions 9) in accordance with the specific data source system 21.

The data mapping module 24 may utilise a plurality of data source system specific data mappings 17 for mapping the data per fact category specifically for differing types of data source systems 21.

In this way, data from differing data source systems 21 are each mapped by an appropriate mapping 17 for appropriate storage within the partitions 16 and dimensions 9.

Data mapping differs from the regular data warehousing approaches in that the load process is tightly coupled to the database structures 9 and 16 and holds no direct coupling to the source system transaction 20 thereby making the repository data source agnostic. Similarly, the data source system may change for the production of the originating data without the data warehouse needing to change in any form. This static nature of the repository ensures that robustness of structure remains and no data ever becomes obsolete even if the business changes. The mapping for this "Load" process is the component that is unique to the client for their informational need.

Fact Partition Data Categories

As alluded to above, the repository 8 utilises fact partitions 16 partitioned by specific partitioned data categories.

The specific fact partition data categories confer "universal type descriptor capabilities" to the repository 8 in being able to store data in relation to most, if not all, conceivable scenarios from potentially any number of data source systems 21.

In a preferred embodiment, the fact partitions 16 comprise all of the types of fact partitions as shown in FIG. 3. However, in certain embodiments, and albeit with potential limitation to the differing types of transactions that may be stored within the repository 8 (which may not be an issue for particular data source systems and associated transactions).

For example, the monetary fact partition 12 may be omitted for data source systems 21 not dealing with monetary based transactions.

The data categorisations are specifically selected since their combined effect embodies an ability to reference almost anything from any type of process, business activity, event and type of data known to man. The model can hold detailed readings from electronic equipment to physical locations of objects globally and there is envisaged to be few or no (according to our current knowledge) requirement that would cause extension of the current types. This selection whilst being complete in all respects does not restrict different naming of the facts for any one client, rather, it is illustrative of the information type represented in the fact partitions 16

The fact partitions 16 may comprises an event fact partition 10.

The event fact partition 10 may store an event type such as a purchase event, the delivery event, a hire of an employee event, a vehicle repair event, a child's birth event and other types of events that are by nature singular in their representation.

In embodiments, the event data category may comprise an enumeration data category.

The fact partitions 16 may further comprises a quantitative fact partition 11 capable of storing a quantity. In this regard, the quantitative fact partition 11 may comprise a numeric value.

For example, the quantity may represent a number of units sold and therefore comprise an integer data type. Alternatively, the quantity may represent a weight of goods received and therefore comprise a floating point data type.

The fact partitions 16 may further comprise a monetary fact partition 12 capable of storing a monetary amount. In this regard, the monetary fact partition 12 may comprise a numeric value.

For example, the monetary amount may be that a product was bought for $8.25 and sold for $10.59. As such, the monetary fact data category may be a floating point data type or the like capable of storing the monetary amounts to at least two decimal places and potentially more.

The fact partitions 16 may further comprises a GIS fact partition 13 capable of storing a GIS location. For example, the GIS fact partition 13 may store the fact that an asset is currently located at a particular location.

In embodiments, the GIS fact partition 17 data category may comprise a struct data type comprising two floating point data types so as to be able to represent latitude and longitude.

The fact partitions 16 may further comprises a percentile fact partition 14 capable of storing a percentile value.

For example, the percentile fact partition 14 may store a value-added tax (VAT) percentile value. In this regard, the percentile fact partition 14 may store a numeric data type, such as an integer, floating point value or the like.

The fact partitions 16 may further comprises a reference fact partition 15 capable of storing reference values.

The reference fact partition 15 is used for storing references, such as invoice numbers, part numbers and the like. In this manner, the reference fact partition 15 may, for example, utilise a Varchar data type capable of storing both string and numeric data values.

The fact partition 16 may further comprise an unstructured data fact 15 which may be utilised for storing links to unstructured data. For example, when utilised by a law firm organisation, the unstructured data may represent a URL or other resource locator locating particular legal documents.

Shared Dimensions 9

The shared dimensions 9 are utilised by the repository 8 for providing context for the fact partitions 16.

As further alluded to above, the shared dimensions 9 are common to each of the fact partitions 16 albeit that specific fact categories may not require association to every one of the dimensions.

For example, for the product dimension 3 as described in further detail below, the product dimension 3 may be shared by each of the fact partitions 16.

In this manner, the repository 8 may record any of that 1) a product type was sold; 2) three products were sold; 3) three products were sold for $10.59; 4) three products were sold for $10.59 at a particular location; 5) three products were sold for $10.59 (excluding VAT at 10%) at a particular location; 6) three products were sold for $10.59 (excluding VAT at 10%) at a particular location with sale reference "SAL-13262" and 7) three products were sold for $10.59

(excluding VAT at 10%) at a particular location with sale reference "SAL-13262" having a PDF receipt accessible using a particular URL.

Again, in a preferred embodiment, the data source system agnostic information repository 8 comprises all of the shared dimensions 9 as shown in FIG. 3. However, in embodiments, albeit perhaps with limitation to the differing types of transactions that may be stored in the repository 8, a subset context descriptive ability of the repository 8, a subset of the shared dimensions 9 may be employed (which may not be problematic for certain types of data source systems 21 dealing only in certain types of transactions).

The shared dimensions 9 may comprise a product dimension 3. The product dimension 3 may store information relating to commercial products (and services). For example, iron ore grades, construction element types (Concrete, reinforcing bar etc.), Banking Account types, Retail items, Cars, Schools, medical procedures or any collective grouping association for any of the fact partitions.

The shared dimensions 9 may further comprise an asset dimension 3 configured for storing data relating to various assets. For example, a vehicle from the logistics system, a crane, a crusher, an x-ray machine, a watch, a mobile phone, a projector or laptop, in essence, any tangible item that may or may not have business or personal value associated.

The shared dimensions 9 may further comprise a location dimension 23 for storing location information such as physical or logical information.

The shared dimensions 9 may further comprise an entity dimension 5 for storing information in relation to various entities. The entities dimension 5 may further comprise person and company information (not shown) for storing information specific to persons and companies.

The shared dimensions 9 may further comprise additional dimensions 6 and 7 for storing further as-yet unspecified dimension types. These will be specific per organisations need and are included in the design to permit unique extension of the model for a specific requirement.

Unique Timestamp Data

Now, in one embodiment, various data is related in the fact partitions 16 using unique timestamps.

As such, for each entry in the fact partitions 16, the unique timestamp data is also stored.

As such, so as to subsequently retrieve data from the fact partitions 16, a join select query is employed utilising the unique timestamp data to re-assemble the relevant data if and when required.

Where the repository 8 is implemented, the specific timestamp data column within each of the fact partitions 16 may be configured as being unique.

Additional Organisational Specific Dimensions

Now, as opposed to prior art normalised database approach wherein additional subject specific tables are added for business specific customisation, additional contextual information may be stored within the repository 8 by adding columns/attributes to the relevant shared dimensions 9 database table.

EXAMPLE 1

Product Sale

Figure 4:
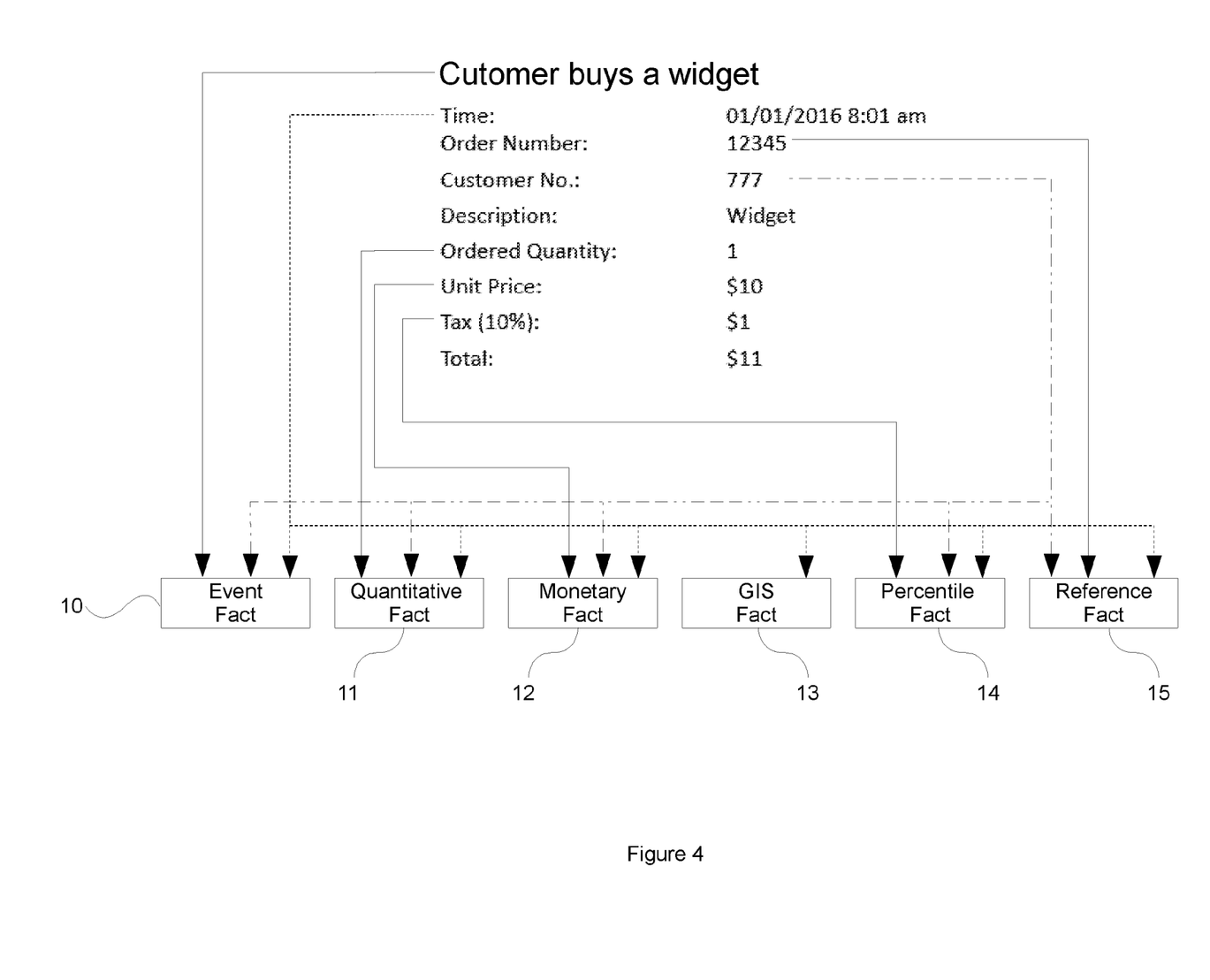
FIG. 4 shows an exemplary scenario wherein the data source system agnostic information repository of FIG. 3 is applied to a product purchase event transaction.

Turning now to FIG. 4, there is shown an exemplary application of the repository 8 for storing a product purchase event transaction.

The product purchase event transaction may be initially recorded by an e-commerce data source system 21 which may be retrieved, at periodic intervals, within other e-commerce transactional data using the data receiver 18.

Thereafter, the data mapping 24 maps the received transactional data 20 into the relevant fact partitions 16 and links this to the shared dimensions 9 utilising the data source system specific data mappings 17.

In the exemplary embodiment provided, the partitioning of the data into fact partition data categories is shown in solid lines.

The unique category dimensions are shown in dashed lines and the additional organisational specific dimensions shown in dotted lines.

Specifically, the customer buying a widget may be resolved into a purchase event transaction by the source system 21 and then mapped into the event partition table 10 representing a purchase event and linked to the product shared dimension table 3 identifying the widget.

Thereafter, the order quantity may be stored within the quantitative fact 11 partition, the unit price may be stored in the monetary fact partition 12 and the 10% tax may be stored in the percentile fact partition 14.

As can be seen, the unique timestamp, which may be obtained from the data itself, or generated from the system clock for example, is stored within each of the fact partitions so as to allow the subsequent retrieval therefrom utilising a join select statement.

As such, for a particular purchase event stored within the event fact partition 10, the associated order quantity, unit price and tax amount may be retrieved from the qualitative fact partition 11, monetary fact partition 12 and percentile fact partition 14 utilising the same timestamp.

EXAMPLE 2

Travelling Truck

Figure 5:
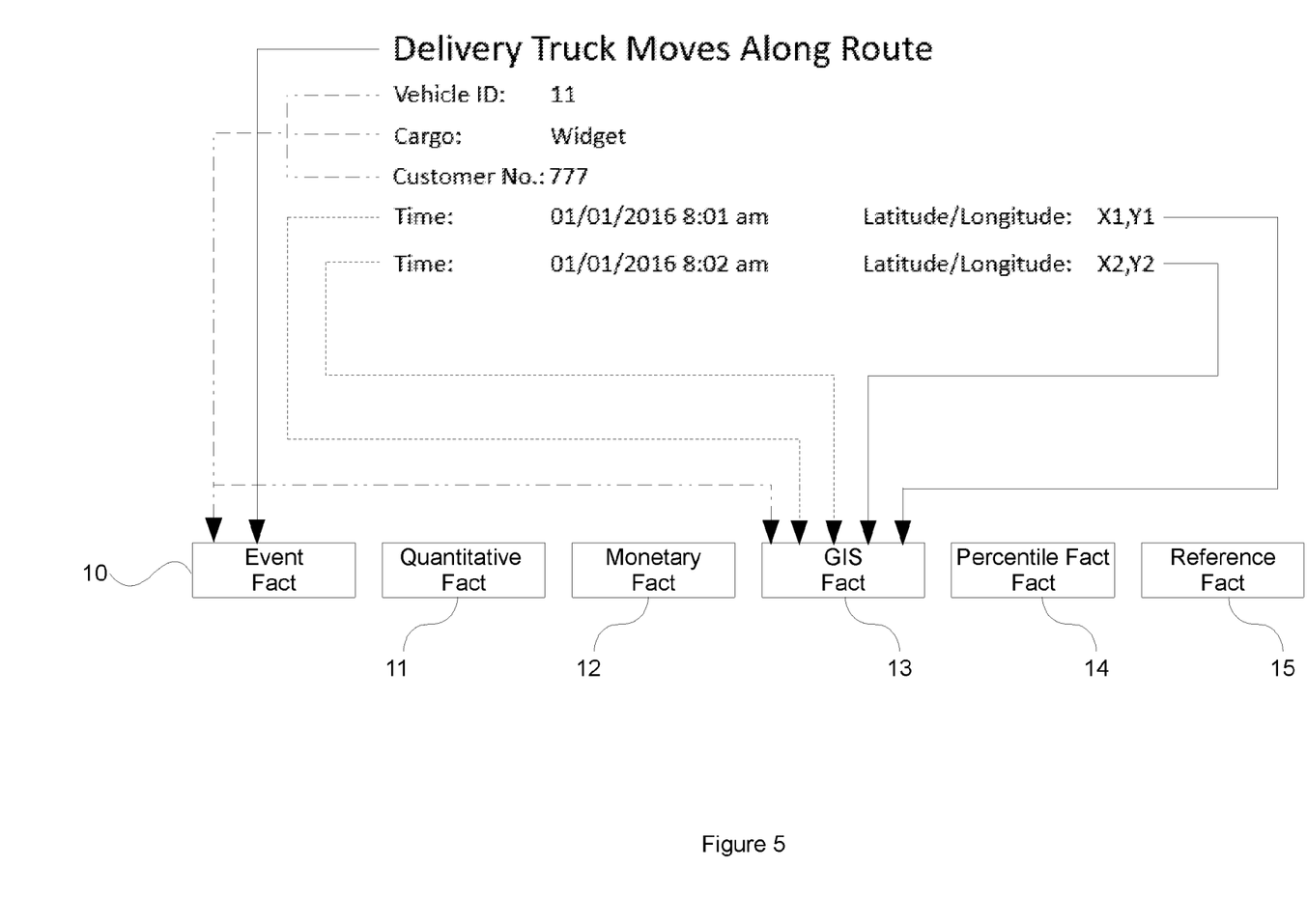
FIG. 5 shows an exemplary scenario wherein the data source system agnostic information repository of FIG. 3 is applied to a delivery truck movement event transaction.

Turning now to FIG. 5, there is shown a yet further exemplary application of the repository 8 for storing a delivery truck movement event.

Specifically, in the exemplary application, a delivery truck moves from a first location (comprising latitude and longitude coordinates) at a first time to a second location at a second time.

As can be seen, the data may be partitioned into the event fact partition 10 and the GIS fact partition 13.

Furthermore, the vehicle ID, cargo and customer number may be stored as additional organisational specific context by configuring additional columns in the shared dimensions 9 tables linked by foreign key to the event fact partition 10 and the GIS fact partition 13.

In addition to the unique timestamp data being stored within the tables corresponding to the event fact partition 10 and the GIS fact partition 10, the first and second timestamps corresponding to the first and second locations are also stored within the GIS fact partition 13.

As can be appreciated from the above two examples, the same fact partitions 16 are utilised to record both the product purchase and movement event transactions wherein, if organisational specific customisation is required, additional columns may be added to the tables of the shared dimensions 9 so as to avoid having to manipulate the underlying table structure of the fact partitions 16 and shared dimensions 9.

Exemplary Entity Relationship Diagram

Figure 6:
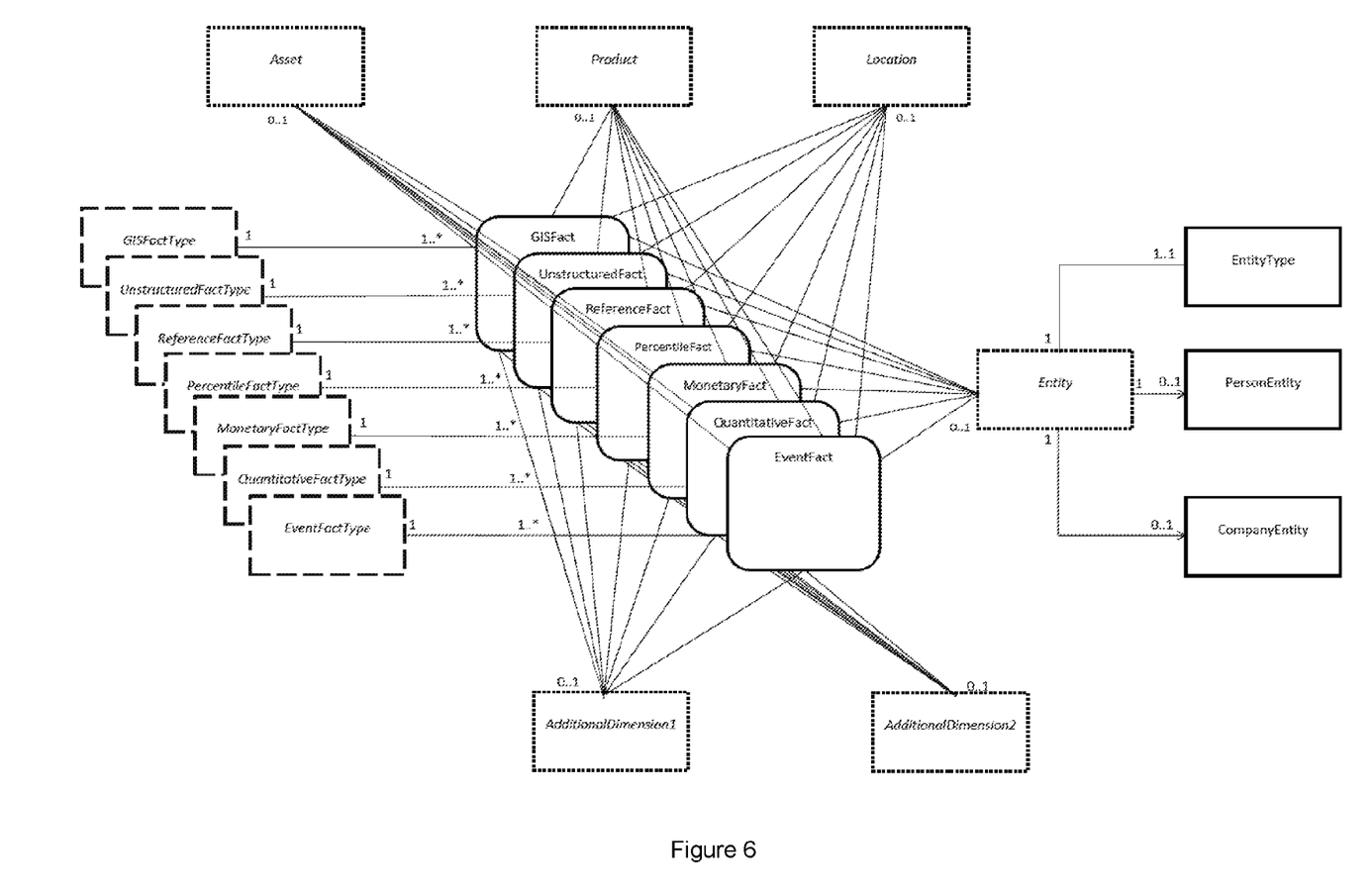
FIG. 6 shows an exemplary entity relationship diagram for the data source system agnostic information repository in accordance with an embodiment.

Turning to FIG. 6, there is shown an exemplary entity relationship diagram of the repository 8 wherein, for the represented entity relationships, 1 represents a single record, 0 . . . 1 represents zero or one records, 1 . . . 1 represents a one-to-one relationship and 1 . . . * represents a one-to-many relationship.

Furthermore, the categorised fact partition categories are shown in rectangles having dashed lines with straight corners having respective associated transactional/descriptive facts shown in rectangles having solid lines and rounded corners.

There is also show the shared dimensions 9 shown in relation to the associated transactional facts 16 in dotted rectangles with straight corners.

Furthermore, dimension enrichment is shown in rectangles with solid lines having straight edges wherein, for example, the entity dimension 5 is shown as potentially having an associated entity type representing a person or a company entity.

Furthermore, the joining lines represent foreign key relationships and adjoining lines having arrowheads represent parent-child relationships.

Exemplary Technical Scenario

There is now provided an exemplary technical scenario for further illustrating the features and functionality of the data source system agnostic data repository in accordance with a specific embodiment.

It should be noted that the specific embodiment provided hereunder is provided primarily for illustrative purposes and therefore comprises specific technical implementation details.

However, the embodiments of the invention should not be limited to these specific technical implementation details wherein modifications may be made thereto within the purposive scope and spirit of the invention.

The below exemplary technical scenario is implemented on a Microsoft SQL® 2016 database using Microsoft .Net programming languages and XML structures. The same may be implemented using any relational database (e.g. Oracle, DB2, MySql) or Columnar Database (e.g. NoSQL, MongoDB), any programming language (e.g. Python, Java etc.) and any message structure technology (e.g. Html, JSON etc.).

Exemplary Technical Scenario—Development Effort 1

Initially, business user "X" desires the inclusion of point of sale data into the business analytics flexible repository. Technically, the point of sale solution is an Oracle based transactional solution with specific transactional reference to value, product, quantity and in some cases customer information of rewards based customers. SQL database tables are designed and built to represent dimensions 9.

Exemplary Technical Scenario—Development Effort 1—Client Framework Development

Product is loaded via a Product Load .Net Program from an explicitly designed XML structure aligned to the Product dimension table. The product master source provides the complete list of products for the client in a spreadsheet, this is parsed into the Product XML Structure and the Product Dimension load initiated;

Location is loaded via a Location Load .Net Program from an explicitly designed XML structure aligned to the Location dimension table. The location master source provides the complete list of locations both logical and physical of relevance to the client (Outlet, Division, Department, Building) in a client spreadsheet, this is parsed into the Location XML and the Location Dimension load initiated;

Entity is loaded via an Entity Load .Net Program from an explicitly designed XML structure aligned to the Entity dimension table. The entity master source provides the complete list of customers of relevance to the client from the rewards program file in a client spreadsheet, this is parsed into the Entity XML and the Entity Dimension load initiated;

The Fact Partition tables are defined with referential integrity through Foreign Key constraints between the created Fact Categories and the Dimensions as loaded;

Exemplary Technical Scenario—Development Effort 1—Primary Deliverable Development The source database is a normalised database to 3rd normal form with more than 300 tables in the operational database. A Database Trigger is built into the Oracle Database on the primary transaction table to initiate a custom built stored procedure. The custom stored procedure 19 creates multiple XML records based on the user's documented requirement as follows:

a. A "Sale" Event Partition Fact in XML format with full key value pair reference to the Product (Product Dimension 3), the sale transaction customer (Entity Dimension 5), the date and time of the transaction (Time Stamp) and the location record Location Dimension 23) that represents the retail outlet;

b. A "Sale" Quantitative Partition Fact in XML format with full key value pair reference to the Product (Product Dimension 3), the quantity of the product in the sale transaction (Quantitative Fact 11), the date and time of the transaction (Time Stamp), the sale transaction customer (Product Dimension 3) and the location record (Location Dimension 23) that represents the retail outlet;

c. A "Sale" Monetary Partition Fact in XML format with full key value pair reference to the Product (Product Dimension 3), the monetary value of the transaction (Monetary Fact 12) representing the product in the sale transaction (viz. Line Item), the date and time of the transaction (Time Stamp), the sale transaction customer (Entity Dimension 5) and the location record that represents the retail outlet (Location Dimension 23);

The above records have a specific naming standard of "Sale" to depict the fact type business key in the dimension tables "EventType", "QuantitativeType" and "MonetaryType", this business key is used by the load process to correctly type the records in the warehouse within their respective fact categories.

Once created, these records are "Published" to a designated Directory location where file listeners will initiate one of the designed load processes 16 per record received. These load processes are .Net programs that use the created XML file and retrieves the SQL Unique ID of the context (Viz. Product, Customer, Location etc.) and constructs a fact record that is subject of a SQL Insert statement using the retrieved unique keys from the dimension table 9. Any records that are missing the defined minimum required dimension associations for the "Sale" type or whose dimension keys have not yet been loaded are placed in a Parking Lot table in the database and notifications sent out to alert support staff of the failed records. These are addressed by specific customer defined processes per record failure and reason.

Once inserted, the client uses a MicroStrategy Business Intelligence mining tool to surface the stored data in either a report or dashboard/graphical format.

Exemplary Technical Scenario—Development Effort 2

Business user "X" then decides to add data from the accounting source system to make 'Cost of Product' in the flexible repository. The financial system of record is a cloud based MYOB solution with Web Service API interfaces for extraction of financial transactions and other detail from the system of record.

Since there is no access to the cloud based database directly, the Web Service API's for the retrieval of "Procurement" information are called from a scheduled program written in .Net. The program runs every hour and asynchronously calls the target API in the MYOB cloud with the timestamp of the last call, the API then returns all the purchases recorded in the financial system since the timestamp parameter provided in JSON format to a pre-defined directory location for this purpose for this client.

A file listener is triggered by the arrival of the output file in this example (if there are any records found otherwise nothing is triggered) and it in turn initiates a 'Procurement Mapping'.Net program which maps the "Purchase" information into multiple records as below:

a. A "Purchase" Event Partition Fact in XML format with full key value pair reference to the Product (Product Dimension 3), the purchase transaction supplier (Entity Dimension 5), the date and time of the transaction (Time Stamp) and the location record that represents the retail outlet (Location Dimension 23)—Note this XML structure is the same as the "Sale" Event Partition developed in Development Effort 1 above;

b. A "Purchase" Quantitative Partition Fact in XML format with full key value pair reference to the Product (Product Dimension 3), the quantity of the product in the purchase transaction (Quantitative Fact 11), the date and time of the transaction (Time Stamp), the purchase transaction supplier (Dimension 5) and the location record that represents the retail outlet (Location Dimension 23)—Note this XML structure is the same as the "Sale" Quantitative Partition developed in Development Effort 1 above;

c. A "Purchase" Monetary Partition Fact in XML format with full key value pair reference to the Product (Product Dimension 3), the monetary value of the purchase transaction (Monetary Fact 12) representing the product and the purchase transaction supplier (Entity Dimension 5), the date and time of the transaction (Time Stamp), and the location record that represents the retail outlet (Location Dimension 23)—Note this XML structure is the same as the "Sale" Monetary Partition developed in Development Effort 1 above;

The above records have a specific naming standard of "Purchase" to depict the fact type business key in the dimension tables "EventType", "QuantitativeType" and "MonetaryType". This business key will be used by the load process to correctly type the records in the warehouse within their respective categories.

Once created, these records are "Published" to a designated Directory location where file listeners will initiate one of the designed load processes 16 per record received. These load processes are the same .Net load modules that were designed and built as part of Development Effort 1 above and therefore operate exactly the same.

Once inserted, the client uses a MicroStrategy Business Intelligence mining tool to surface the stored data in either a report or dashboard/graphical format. Note that there are now 2 transaction types loaded into the same structure, that allows for greater analysis and reporting versatility.

Exemplary Technical Scenario—Development Effort 3

Business user "X" then decides to add data from the human resources ("HR") source system to make Staff Member's details available in the flexible repository. The HR system of record is an on premise installed solution using SQL Server database technology behind a Windows® Forms application front-end. A custom HR source system Stored Procedure is built to create output records for each person from the system based on the last updated timestamp in the source system. The program runs every hour as a SQL Scheduled Task, extracting Human Resource data and mapping it into the existing organisations Entity dimension XML structure. A .Net matching program on Given Name, Surname and Date of Birth is added to the existing Entity dimension load .Net Program to ensure duplicates are not created inadvertently. Extracted data in the modified Entity XML structure (employee ID was added to initial framework definitions) is mapped into the XML structure and after checking for duplicates on an "Insert" SQL instruction, records are either "Created", "Updated" or "Deleted" (Logical record de-activation only) as per the update checks added.

The .Net Program and XML for the "Sales" process in Development Effort 1 is updated to carry the "Staff Number" associated to the employee and the extract Stored Procedure provides the Employee ID of the Sales Person. The following updates are performed:

a. The relevant "Sales" Partition Fact is enhanced to carry 'Salesperson' identifiers to allow a second connection to the Entity for each and every fact type partition.

Exemplary Technical Scenario—Development Effort 4

Business user "X" then decides to add attendance data from the human resources source system to make 'Staff Member's Productivity' available for analysis in the flexible repository. The custom HR source system Stored Procedure is enhanced to carry a timesheet Indicator parameter to create output records for each timesheet entry from each employee daily when the parameter is provided. The program runs daily as a SQL Scheduled Task, extracting Human Resource timesheet data and mapping it into the existing organisations Entity dimension XML structure for each shift start and shift end in a designated file location. A file listener is triggered by the arrival of the output file in this example (if there are any records found otherwise nothing is triggered for Sundays) and it in turn initiates a 'Timesheet Mapping'.Net program which maps the "Timesheet" information into multiple records as below:

a. A "ShiftStart" Event Partition Fact in XML format with full key value pair reference to the employee entity (Entity Dimension 5), the date and time of the transaction (Time Stamp) and the location record that represents the retail outlet (Location Dimension 23)—Note again this XML structure is the same as the Event Partition developed in Development Effort 1 above;

b. A "ShiftEnd" Event Partition Fact in XML format with full key value pair reference to the employee entity (Entity Dimension 5), the date and time of the transaction (Time Stamp) and the location record that represents the retail outlet (Location Dimension 23)—Note again this XML structure is the same as the Event Partition developed in Development Effort 1 above;

The above records have a specific naming standard of "ShiftStart" and "ShiftEnd" to depict the fact type business key in the dimension table "EventType", this business key will be used by the load process to correctly type the records in the warehouse within the Event Partition Fact categories. Once created, these records are "Published" to a designated Directory location where file listeners will initiate the single Event load process 10 per record received. These load processes are the same .Net load modules that were designed and built as part of Development Effort 1 above and therefore operate exactly the same.

Once inserted, the client uses a MicroStrategy Business Intelligence mining tool to surface the stored data in either a report or dashboard/graphical format. Note that there are now 4 types loaded in the same repository structure, that allows for greater analysis and reporting versatility.
Interpretation Embodiments Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.
Different Instances of Objects As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.
Specific Details In the description provided herein, numerous specific details are set forth. However, it is understood that embodiments of the invention may be practiced without these specific details. In other instances, well-known methods, structures and techniques have not been shown in detail in order not to obscure an understanding of this description.
Terminology In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.
Comprising and Including In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.
Scope of Invention Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the data warehousing industries.

The invention claimed is:

1. A data source system agnostic fact partitioned data information repository system comprising:
   a data repository comprising:
   a plurality of fact partitions categorized by type or category of data and not by subject area, wherein the plurality of fact partitions are a plurality of static fact partitions, the plurality of fact partitions being pre-determined and established without any requirement for analysis of data;
   a plurality of dimensions stored in relation to the fact partitions, the plurality of dimensions shared by the fact partitions to permit one of the plurality of fact partitions to be mapped to one or more of the plurality of dimensions, wherein the plurality of dimensions are a plurality of static dimensions, the plurality of dimensions being pre-determined and established without any requirement for analysis of data; and
   a plurality of data source system specific data mappings;
   a data receiver for receiving data from the plurality of data source systems; and
   a data mapper for partitioning the data into the plurality of fact partitions using the plurality of data source system specific data mappings, wherein
   the data repository receives data from differing operational source systems without modification to the plurality of fact partitions;

wherein a data type of at least one of the plurality of fact partitions is at least two data types and wherein storing the at least two data types comprises storing the at least two data types in at least two of the fact partitions with each comprising a timestamp value; and wherein retrieving data from the repository comprises joining the at least two data types using by timestamp value in order to re-construct a source transaction.

2. The system as claimed in claim 1, wherein the plurality of fact partitions comprises an event fact partition for storing an event occurrence.

3. The system as claimed in claim 1, wherein the plurality of fact partitions comprises a quantitative fact partition for storing a quantity.

4. The system as claimed in claim 1, wherein the plurality of fact partitions comprises a monetary fact partition for storing a monetary amount.

5. The system as claimed in claim 1, wherein the plurality of fact partitions comprises a GIS fact partition for storing a GIS location.

6. The system as claimed in claim 1, wherein the plurality of fact partitions comprises a percentile fact partition for storing a percentile value.

7. The system as claimed in claim 1, wherein the plurality of fact partitions comprises a reference fact partition for storing a reference value.

8. The system as claimed in claim 1, wherein the plurality of fact partitions comprises an unstructured fact partition for storing a link to unstructured data stored either within the data warehouse or in a different location.

9. The system as claimed in claim 1, wherein the plurality of dimensions comprises a product dimension capable of storing product-related data.

10. The system as claimed in claim 1, wherein the plurality of dimensions comprises an asset dimension capable of storing asset-related data.

11. The system as claimed in claim 1, wherein the plurality of dimensions comprises a location dimension capable of storing location-related data.

12. The system as claimed in claim 11 wherein the location-related data comprises at least one of either physical or logical location-related data.

13. The system as claimed in claim 1, wherein the plurality of dimensions comprises an entity dimension capable of storing entity-related data.

14. A data source system agnostic fact category partitioned data information repository system comprising:
  a data repository comprising:
  a plurality of fact partitions categorized by type or category of data and not by subject area, wherein the plurality of fact partitions are a plurality of static fact partitions, the plurality of fact partitions being pre-determined and established without any requirement for analysis of data, the plurality of fact partitions comprising:
  an event fact partition for storing an event;
  a quantity fact partition for storing a quantity;
  a monetary fact partition for storing a monetary amount;
  a GIS fact partition for storing a GIS location;
  a percentile fact partition for storing a percentile value; and a reference fact partition for storing a reference value;
  a plurality of dimensions stored in relation to the fact partitions, the plurality of dimensions shared by each of the fact partitions to permit one of the plurality of fact partitions to be mapped to one or more of the plurality of dimensions, wherein the plurality of dimensions are a plurality of static dimensions, the plurality of dimensions being pre-determined and established without any requirement for analysis of data, the plurality of dimensions comprising:
  a product dimension capable of storing product-related data;
  an asset dimension capable of storing asset-related data;
  a location dimension capable of storing location-related data; and
  an entity dimension capable of storing entity-related data; and
  a plurality of data source system specific data mappings;
  a data receiver for receiving data from the plurality of data source systems; and
  a data mapper for partitioning the data into the plurality of fact partitions using the plurality of data source system specific data mappings, wherein
  the data repository receives data from differing operational source systems without modification to the plurality of fact partitions;
  wherein a data type of at least one of the plurality of fact partitions is at least two data types and wherein storing the at least two data types comprises storing the at least two data types in at least two of the fact partitions with each comprising a timestamp value; and wherein retrieving data from the repository comprises joining the at least two data types using by timestamp value in order to re-construct a source transaction.

15. The system as claimed in claim 14 wherein the fact partitions further comprise an unstructured fact partition for storing a link to an unstructured data element location.

16. A method for storing data within a data source system agnostic fact partitioned data information repository system, the system comprising a data repository comprising:
  a plurality of fact partitions, partitioned by fact partition data categories and categorized by type or category of data and not by subject area, wherein the plurality of fact partitions are a plurality of static fact partitions, the plurality of fact partitions being pre-determined and established without any requirement for analysis of data;
  a plurality of dimensions stored in relation to the fact partitions, the plurality of dimensions shared by each of the fact partitions to permit one of the plurality of fact partitions to be mapped to one or more of the plurality of dimensions, wherein the plurality of dimensions are a plurality of static dimensions, the plurality of dimensions being pre-determined and established without any requirement for analysis of data;
  a plurality of data source system specific data mappings;
  a data receiver for receiving data from the plurality of data source systems; and
  a data mapper for partitioning the data into the plurality of fact partitions using the plurality of data source system specific data mappings, the method comprising:
  receiving data;
  partitioning the data into at least one fact partition data category;
  storing the at least one fact partition data category in at least one of the plurality of fact partitions;
  generating dimensional data; and
  storing the dimensional data in at least one of the plurality of dimensions in relation to the at least one of the plurality of fact partitions, wherein
  the data repository receives data from differing operational source systems without modification to the plurality of fact partitions;

wherein a data type of at least one of the plurality of fact partitions is at least two data types and wherein storing the at least two data types comprises storing the at least two data types in at least two of the fact partitions with each comprising a timestamp value; and wherein retrieving data from the repository comprises joining the at least two data types using by timestamp value in order to re-construct a source transaction.

17. The method as claimed in claim 16, wherein the data is received from at least two data sources and wherein the partitioning comprises partitioning the data by data source.

18. The method as claimed in claim 16, wherein the plurality of fact partitions comprises at least two of:
- an event fact partition for storing an event;
- a quantity fact partition for storing a quantity;
- a monetary fact partition for storing a monetary amount;
- a GIS fact partition for storing a GIS location;
- a percentile fact partition for storing a percentile value;
- a reference fact partition for storing a reference value; and
- an unstructured fact partition for storing a link to an unstructured data element location.

19. The method as claimed in claim 16, wherein the plurality of dimensions comprises at least one of:
- a product dimension capable of storing product-related data;
- an asset dimension capable of storing asset-related data;
- a location dimension capable of storing location-related data; and
- an entity dimension capable of storing entity-related data.

* * * * *